United States Patent
Zaguroli, Jr.

[11] Patent Number: 5,649,491
[45] Date of Patent: Jul. 22, 1997

[54] TILT TABLE

[75] Inventor: James Zaguroli, Jr., Drayton Plains, Mich.

[73] Assignee: Knight Industries, Inc., Auburn Hills, Mich.

[21] Appl. No.: 571,597

[22] Filed: Dec. 13, 1995

[51] Int. Cl.⁶ .................................................. A47F 5/12
[52] U.S. Cl. ........................................... 108/7; 108/9
[58] Field of Search .......................... 108/7, 9, 6, 145, 108/1, 20, 21

[56] References Cited

U.S. PATENT DOCUMENTS

| | | | |
|---|---|---|---|
| 2,285,576 | 6/1942 | Fox | 108/9 |
| 4,655,466 | 4/1987 | Hanaoka | 108/145 |
| 5,400,720 | 3/1995 | Stevens | 108/147 |
| 5,511,492 | 4/1996 | Zaguroli | 108/7 |

*Primary Examiner*—Peter M. Cuomo
*Assistant Examiner*—Gerald A. Anderson
*Attorney, Agent, or Firm*—John R. Benefiel

[57] ABSTRACT

A tilt table is supported on one side of a base frame so as to be swung up about rollers allowing movement away from one side of a base frame. A pair of links are pivotally connected to the underside of the table and to the other side of the base frame table to tilt up as its one side rolls away from the base frame one side. A pair of air spring actuators is mounted in a space between cross pieces and fixed to the links and base frame to operate the tilt table.

10 Claims, 4 Drawing Sheets

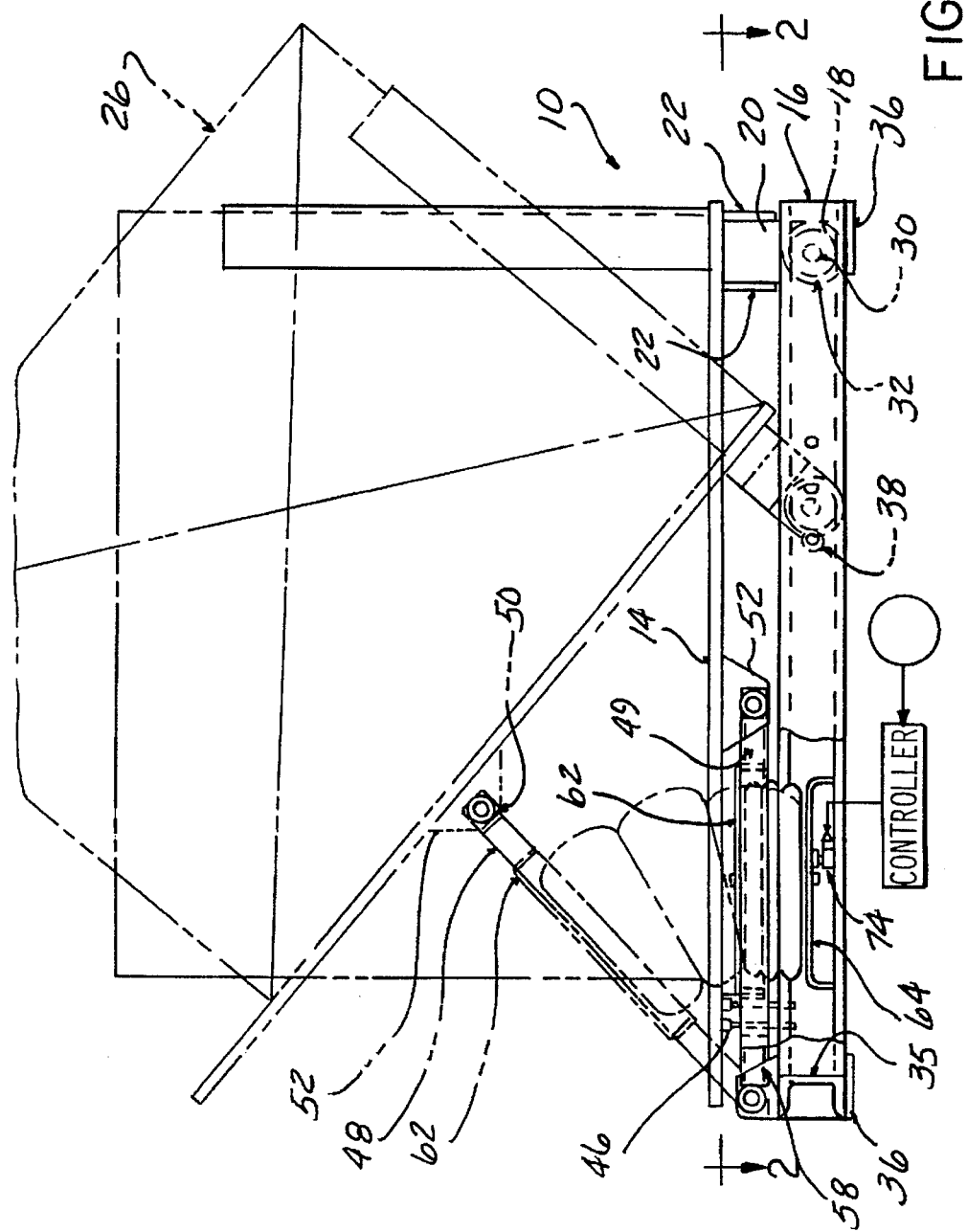

TILT TABLE

FIELD OF THE INVENTION

This invention concerns tilt tables which are hinged tables that may be tilted up on a fixed base as parts are removed to keep a supply of parts within easy reach.

Tilt tables are often used on production lines at assembly stations where parts are removed from a bin on the table by workers at the station.

A result of the upward tilting of the bin towards the worker is the increased impingement of the table and bin into the available working space as the opposite end of the table and bin swings up and towards the work station, crowding the worker as he or she is attempting to assemble the parts.

Copending application U.S. Ser. No. 08/329,205, filed on Oct. 26, 1994 describes one solution to this problem in which the hinged end of the table is mounted for rolling movement on the base, and a cam slot in each of a pair of gusset plates acts on a cam pin fixed to the base to force the hinged table end to roll away from the work station as the table swings up. The pin and slot cam requires gusset side plates on the table at the hinged unload side. While simple and reliable, the gusset plates reduce side access to the top of the table for loading of parts, which can be disadvantageous in some circumstances.

U.S. Pat. No. 5,400,720 issued on Mar. 28, 1995 for a "Tilt and Lift Table" also describes an arrangement for solving the problem of space impingement of a tilt table. In that arrangement, a pair of power cylinders are each pivoted at one end to the base and at the other to the free side of the tilt table. The hinged unload side of the tilt table is supported on rollers to be movable linearly in a track on the base in a direction away from the unload side of the table.

A pair of links are also each pivoted at one end to the base and at the other end to the tilt table. The cylinders are inclined away from the hinged table end, so that when actuated, they push the table free side in a direction away from the unload side of the table as the table is tilted up by the links, acting to push the table up as the hinged side slides towards the linkages.

While accomplishing the end result of moving the hinged side of the table in a direction away from the unload side of the table, the power cylinders are in a nearly aligned orientation with the table and links before the upward tilting begins.

This arrangement creates a considerable mechanical disadvantage acting against the cylinders in lifting the table. With a substantial weight of the parts unloaded onto the table, very high hydraulic pressures are required to overcome the weight and the mechanical disadvantages. The geometry creating the mechanical disadvantage is inherent in the arrangement shown in that patent.

Accordingly, the object of the present invention is to provide a tilt table in which the hinged end moves away from the unload side, but in which there is no obstruction of the tilt table loading surface, nor which required hydraulic cylinders operated at high pressures.

SUMMARY OF THE INVENTION

The above object is accomplished by one or more air spring actuators mounted on the base, collapsed beneath a plate bridging a pair of links each pivoted to the base and the tilt table extending across the links at an intermediate level. The tilt table has a hinged side where unloading is done, which is movable in a direction away from the unloading side as the links swing up. The air spring actuators are expanded by moderate air pressure to act on the links through the bridging plate to raise the links and cause the table to tilt up and at the same time move away from the unloading side.

The air spring actuators act along a line of action maximizing leverage to lift the table and the supported parts at a relatively moderate air pressure. The air spring actuators are also compressed by the weight of the table and parts, and expand as parts are removed so as to tilt the table up automatically to some degree reducing the number of times an operator needs to adjust the air pressure to tilt the table up.

DESCRIPTION OF THE DRAWINGS

FIG. 1 is a side elevational view of a tilt table according to the present invention, showing an upwardly tilted table in phantom lines with portions broken away.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1A:
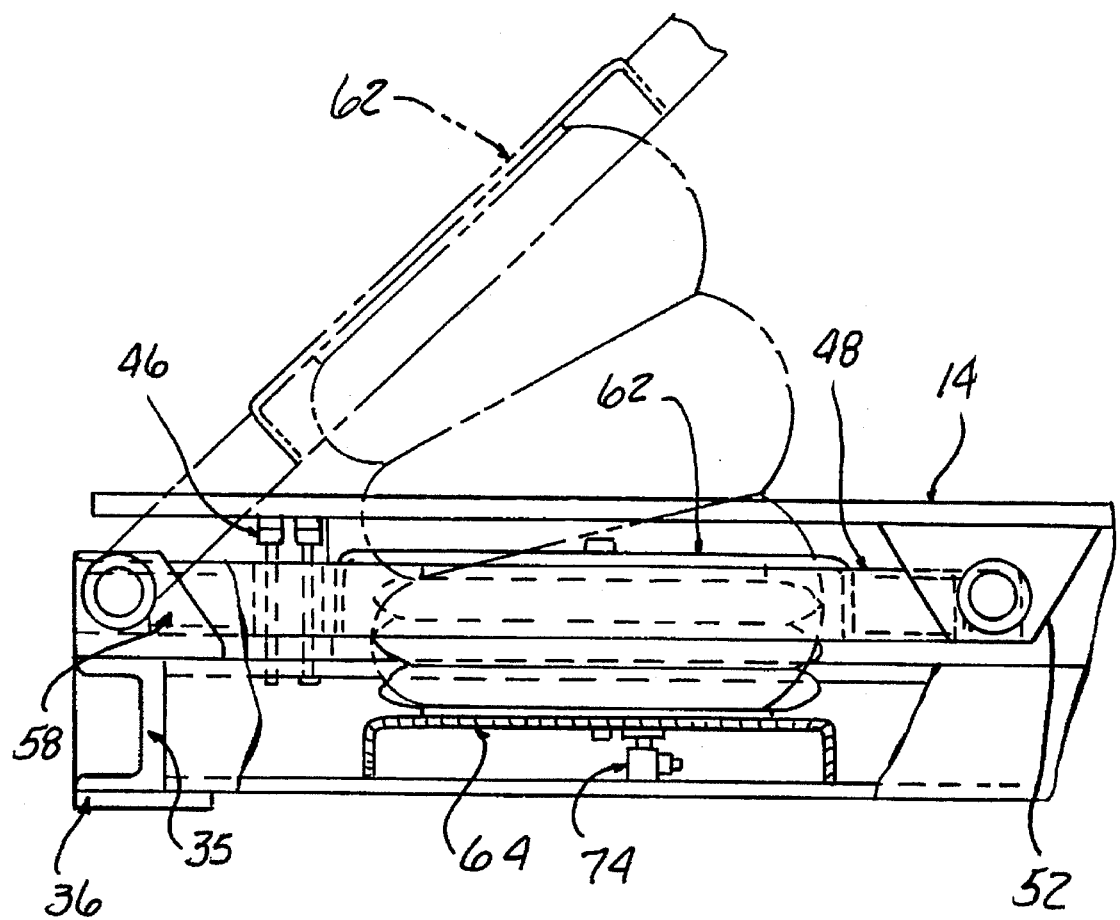
FIG. 1A is an enlarged fragmentary view of a portion of the tilt table shown in FIG. 1, showing certain details thereof.

Referring to the drawings, FIG. 1 shows the tilt table 10 in a lowered position in which a parts bin 12, shown in phantom, is loaded onto a flat plate forming the table 14, extending horizontally above a fixed base frame 16. The table 14 is supported along one side (the unload side) by a pair of roller assemblies 18, each supported on a downwardly extending pedestal 20 welded to the underside of the table 14, reinforced with gussets 22.

Figure 3A:
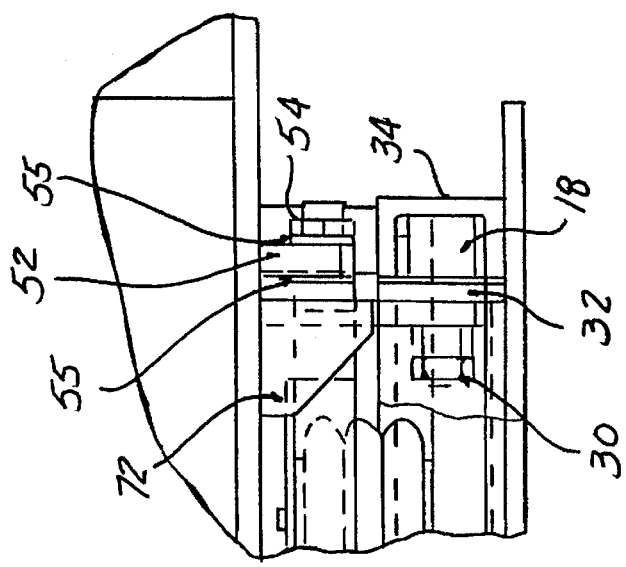
FIG. 3A is an enlarged fragmentary view of the tilt table as shown in FIG. 3 showing certain details thereof.

A pair of upstanding angles 24 welded to the upper surface of the table 14 act to hold a parts bin 26 loaded on the table 14 as the table 14 is tilted by being swung up around the roller assemblies 18. The roller assemblies 18 each include a roller 28 supported on a bolted stud 30, and a thrust washer 32 being against the side edges of a channel 34 (FIG. 3A).

A pair of the channels 34 forming a part of the base frame 16 are welded to a pair of cross plates 36 to form an open rectangular frame, each having bolt holes 37 at each end for anchoring the base 16 to a support surface. A rear channel 35 is also welded to one end of the channels 34.

The channels 34 are positioned with their open sides facing each other, forming tracks for the roller assemblies 28.

The roller assemblies 28 can advance as far as a pair of fixed stops 38, bolted to the inside of a respective channel 34, at a selected adjusted location by a bolt 40 passing through one of a series of drilled holes 42.

When lowered, the table 14 has its other side resting on a pair of rests 46 bolted to the top side of a respective channel 34.

The table 14 also has a pair of spaced apart, parallel links 48 welded to a first upper square cross tube 50 and a second lower cross tube 56, forming a rectangular frame. Cross tube 50 in turn is pivotally supported at either end by plates 52 welded to the underside of table 14 at an intermediate location between the table loading side and the side opposite. Bolts 54 are threaded into the cross tube ends to provide the pivotal support, suitable thrust washers 55 provided (FIG. 3A).

Figure 3:
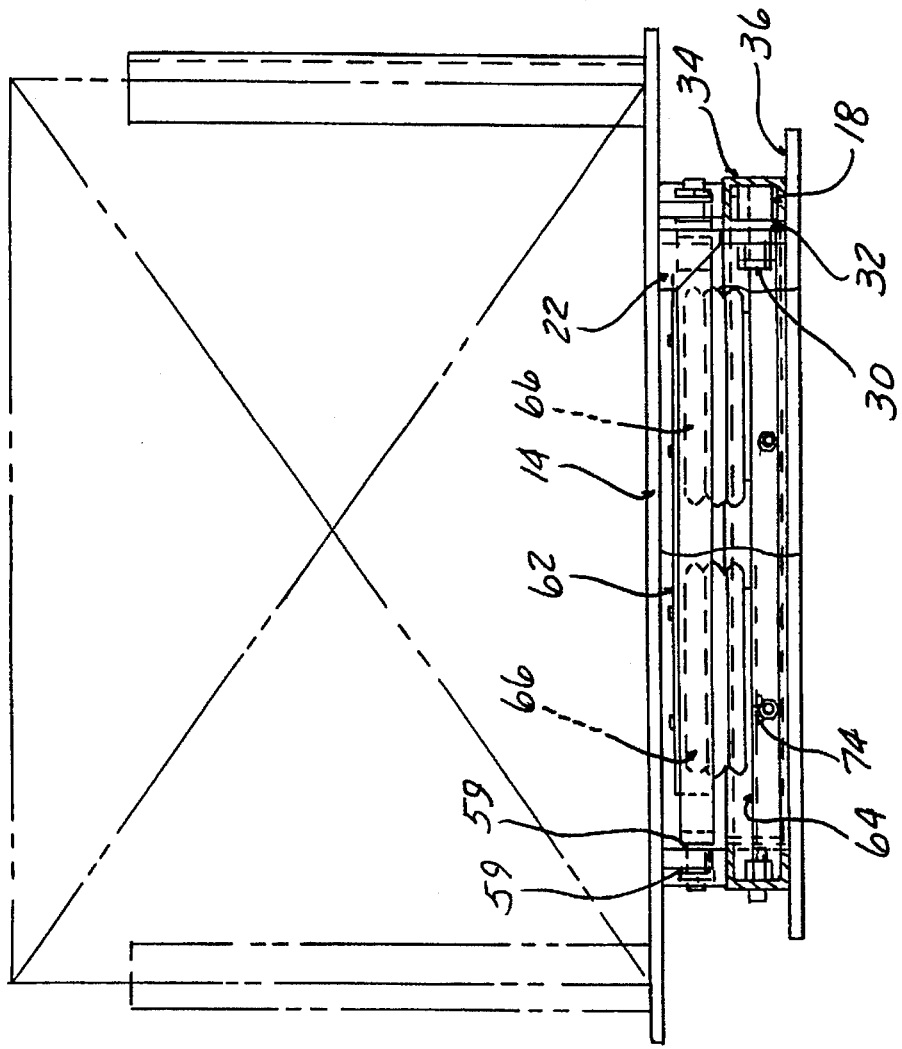
FIG. 3 is an end elevational view of the tilt table shown in FIG. 1, with portions broken away.

The opposite ends of the links 48 are welded to the second square cross tube 56 pivotally supported at either end on plates 58 welded to the top side of the channels 34 at their ends opposite the loading side of the table 14. Bolts 60 are threaded into the tube ends to pivotally support the cross tube 56 on the plates 58, suitable thrust washers 59 provided (FIG. 3).

Thus, the table 14, links 48, and the rolling constraint provided by rollers 18 in channels 34 create a linkage system constraining table 14 to tilt and move its hinged side in a direction away from the unload side of the table 14 (to the left, as indicated in phantom in FIG. 1). This greatly reduces the impingement of the end of the bin 26 and angles 24 into the space on the unload side of the table 14 (to the right in FIG. 1).

According to the invention, power actuation means are provided to act directly on an actuation frame consisting of the links 48, cross tubes 50, 56, as well as a shallow inverted U-shaped cross piece 62 welded to the links 48.

A second inverted U crosspiece 64 is aligned below the first cross piece 62, spaced several inches apart. Mounted in the intervening space is a pair of air spring actuators 66.

The air spring actuators 66 comprise heavy rubber enclosures, consisting of one or more tire-like convolutions which expand from a short height in a bellows fashion when inflated with moderate air pressures, i.e., 20 to 120 psig, exerting forces on the order of several thousand pounds when expanded.

Suitable air spring actuators are commercially available, as for example, AIRSTROKE™ actuators sold by Firestone Industrial Products Company, Noblesville, Ind.

Figure 2:
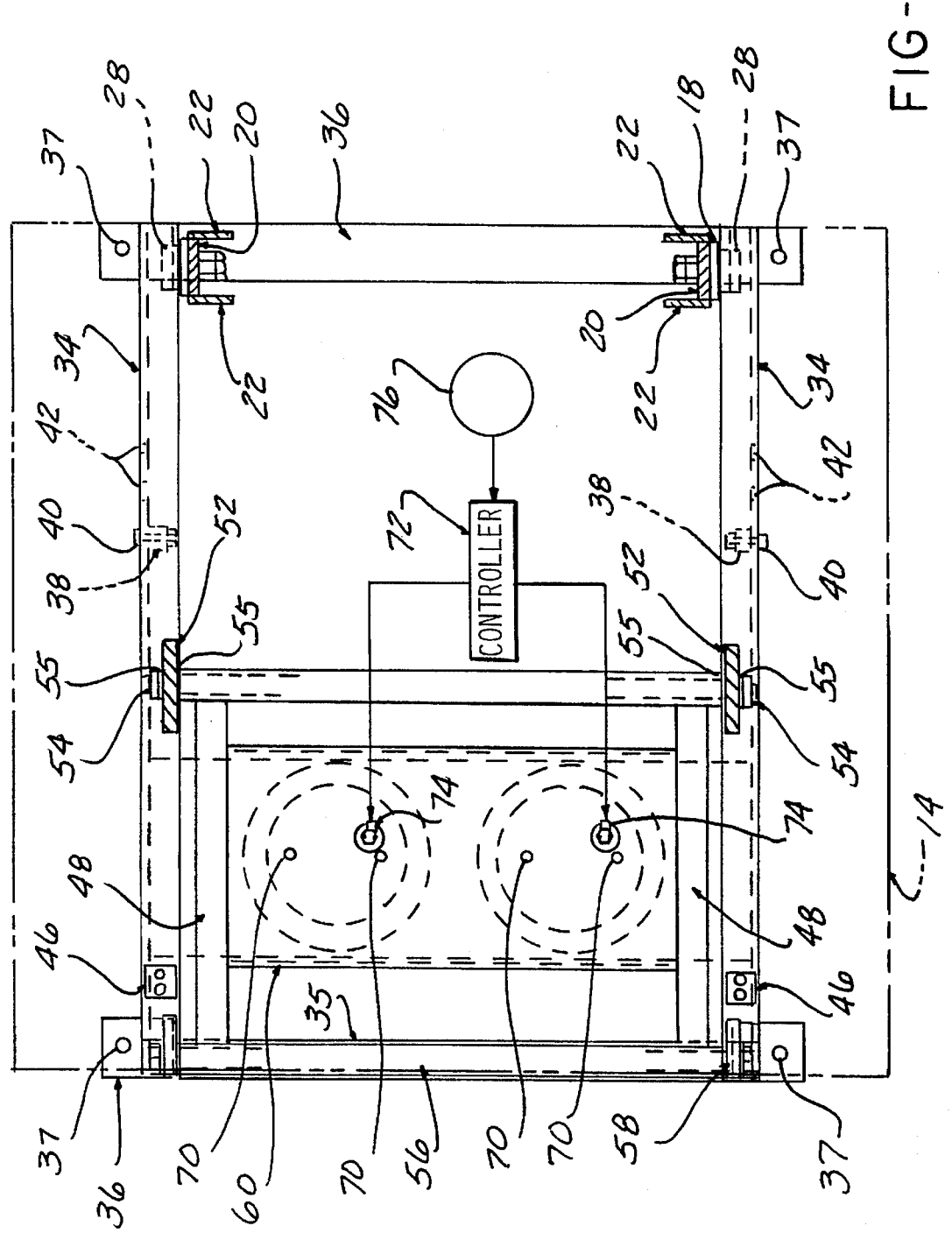
FIG. 2 is a view of a horizontal section taken through the tilt table along the line 2—2 in FIG. 1.

A top and bottom plate of each actuator is attached with several screws, as indicated in FIG. 2.

A control valve 72 controls the inflation and deflation of the actuators 66, connecting a fitting 74 each to a source of air pressure 76 or venting the same to selectively increase or decrease the air pressure.

Each actuator 66 is collapsible to a short height so as to fit in the space between the cross pieces 62, 64 when the table 14 is lowered, but can extend considerably to raise the table 14 to a tilted raised position.

The actuators 66 are arranged to exert a force in a direction perpendicular to the plane of the table 14 to thus exert maximum leverage for tilting about the hinge defined by the roller assemblies 18.

At the same time, the bellows-like nature of the actuators allows bending between the ends thereof to continue to exert a lifting force as the table 14 swings up to extend at an angle to the horizontal and the base 16.

The table surface is the unobstructed other than the bin stop angles 24.

The air spring actuators 66 tend to expand when parts are removed to automatically cause some degree of upward tilting as parts are unloaded without the need for a worker to operate the control valve 72, to reduce the frequency that intervention by the worker is necessary.

I claim:

1. A tilt table comprising:

a generally planar plate comprising a table having an upper surface for holding parts, an underside surface beneath said upper surface, said table having an unload side and an another side opposite said unload side;

a base frame disposed beneath said table having one side adjacent said table unload side and another side away from said unload side of said table;

a set of rollers mounted beneath said unload side of said table, said set of rollers supporting said table for rolling movement on said base frame;

an elongated link having opposite ends, said elongated link pivotally attached at one of said opposite ends to the underside of said table at a point substantially spaced from said unload side of said table, said elongated link pivotally connected at the other of said opposite ends to said base frame adjacent said base frame side away from said table unload side to constrain said table to tilt upwardly by swinging up about an axis defined by said rollers as said rollers are advanced towards said base frame one side to move said table away from said another side of said base frame; and, an actuator connected to said base frame and to said elongated link at a point intermediate the length of said elongated link and acting to urge said elongated link to swing up to tilt said table about said axis defined by said rollers.

2. The tilt table according to claim 1 wherein said actuator includes an air spring actuator fixed at one end relative said elongated link and fixed at an opposite end to said base frame.

3. The tilt table according to claim 2 further including a second elongated link parallel to said first mentioned elongated link pivotally connected at one end to said table and at the other end to said base frame, and wherein said air actuator acts on both of said elongated links.

4. The tilt table according to claim 3 further including a second air spring actuator acting on both of said elongated links.

5. The tilt table according to claim 2 wherein a cross tube is fixed to said elongated links at one end pivotally mounted to said table and a lower cross tube is fixed to the other end of said elongated links pivotally mounted to said frame.

6. The tilt table according to claim 5 wherein a cross piece is fixed to both said elongated links at an intermediate location and said air spring actuator is fixed at one end to said cross piece to act on both of said elongated links through said cross piece.

7. The tilt table according to claim 1 wherein said base frame includes a pair of side by side channels having open sides thereof facing each other, said rollers disposed and running within said channels.

8. The tilt table according to claim 6 further including a second cross piece fixed to said base frame spaced below said first mentioned cross piece, said air spring actuator fixed at another end to said second cross piece.

9. The tilt table according to claim 8 further including a second air spring actuator alongside said first mentioned air spring actuator fixed at one end to said first mentioned cross piece and at another end to said second cross piece.

10. The tilt table according to claim 9 wherein said air spring actuators each comprise a multiple convolution air spring actuator acting in a bellows-like fashion, bending as said table is tilted up by operation of said actuators.

* * * * *